US011105256B2

(12) United States Patent
Zhang et al.

(10) Patent No.: US 11,105,256 B2
(45) Date of Patent: Aug. 31, 2021

(54) SYSTEMS FOR A PRE-CHAMBER

(71) Applicant: Ford Global Technologies, LLC, Dearborn, MI (US)

(72) Inventors: Xiaogang Zhang, Novi, MI (US); Claudia Olivia Iyer, Canton, MI (US); James Yi, West Bloomfiled, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/780,707

(22) Filed: Feb. 3, 2020

(65) Prior Publication Data

US 2021/0239034 A1 Aug. 5, 2021

(51) Int. Cl.
*F02B 19/12* (2006.01)
*F02B 23/10* (2006.01)
*F02B 19/18* (2006.01)

(52) U.S. Cl.
CPC ............. *F02B 19/12* (2013.01); *F02B 19/18* (2013.01); *F02B 23/101* (2013.01); *F02B 2023/106* (2013.01); *F02B 2023/108* (2013.01)

(58) Field of Classification Search
CPC ........ F02B 19/12; F02B 23/101; F02B 19/18; F02B 2023/108; F02B 2023/106
See application file for complete search history.

(56) References Cited

U.S. PATENT DOCUMENTS

| | | | |
|---|---|---|---|
| 8,925,518 B1 | 1/2015 | Riley et al. | |
| 9,353,674 B2 | 5/2016 | Bunce et al. | |
| 10,018,104 B2 | 7/2018 | Grover, Jr. et al. | |
| 2012/0103302 A1 | 5/2012 | Attard | |
| 2016/0053670 A1* | 2/2016 | Tozzi | F02B 19/12 |
| | | | 123/260 |
| 2016/0053673 A1* | 2/2016 | Sotiropoulou | F02B 19/18 |
| | | | 123/260 |
| 2017/0096932 A1* | 4/2017 | Chiera | F02P 13/00 |
| 2017/0122184 A1* | 5/2017 | Hampson | F02B 19/12 |
| 2017/0145898 A1* | 5/2017 | Schafer | H01T 13/467 |
| 2019/0376441 A1* | 12/2019 | Brubaker | F02B 43/04 |

\* cited by examiner

*Primary Examiner* — Xiao En Mo
(74) *Attorney, Agent, or Firm* — Geoffrey Brumbaugh; McCoy Russell LLP

(57) ABSTRACT

Methods and systems are provided for a pre-chamber. In one example, a pre-chamber comprises a plurality of slots fluidly coupling it to a primary combustion chamber. The plurality of slots comprising a plurality of corresponding flaps configured to direct gases through the plurality of slots.

19 Claims, 4 Drawing Sheets

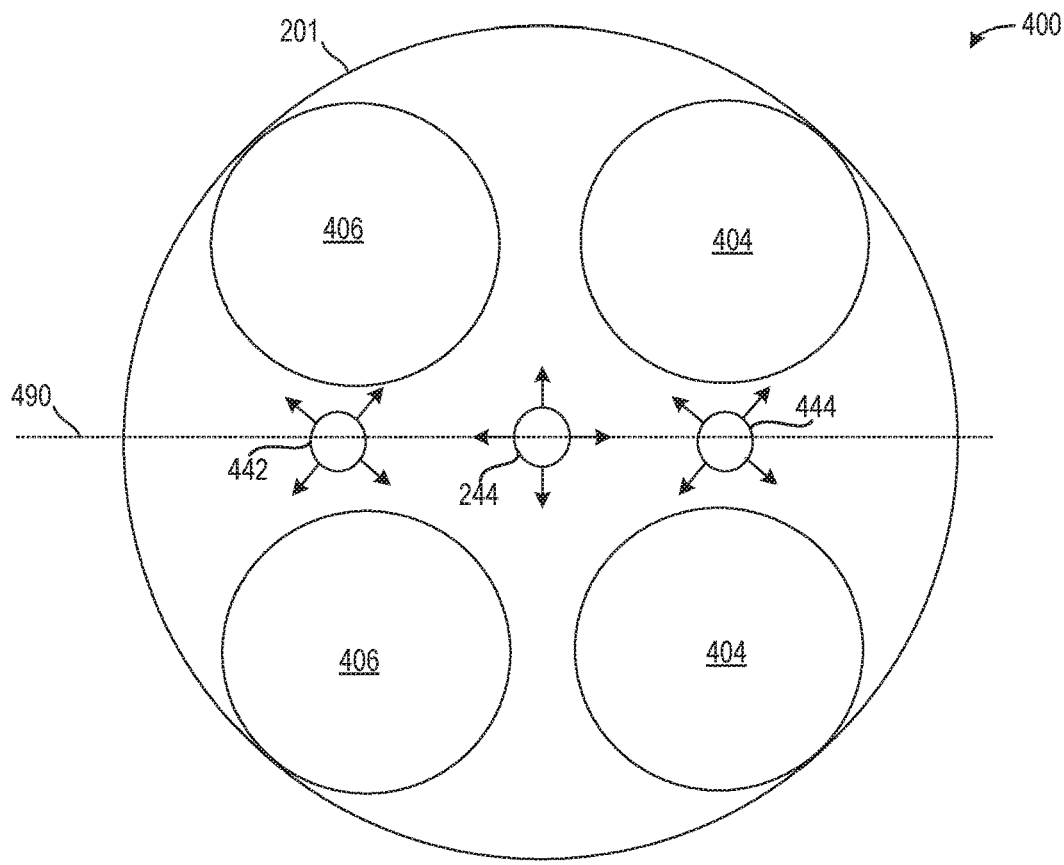
FIG. 4
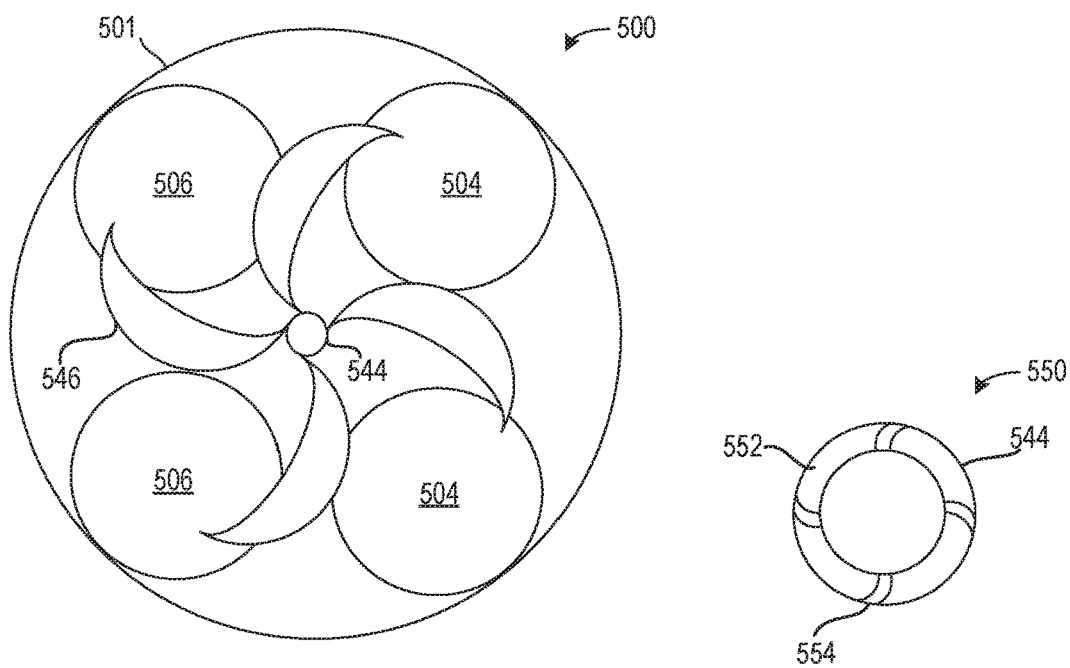
FIG. 5A
FIG. 5B

SYSTEMS FOR A PRE-CHAMBER

FIELD

The present description relates generally to a pre-chamber.

BACKGROUND/SUMMARY

Engines have in the past utilized pre-chamber combustion to increase combustion efficiency and correspondingly reduce emissions. Pre-chamber combustion systems typically include an auxiliary pre-chamber above the main combustion chamber with an ignition device and fuel injector coupled to the auxiliary pre-chamber. In such systems, combustion unfolds in the following sequence; (i) a small amount of fuel is directly injected into the pre-chamber, (ii) spark is provided to the air/fuel mixture in the pre-chamber; and (iii) the hot gas jets into the main combustion chamber to ignite the charge disposed therein. Jetting the ignited gas into the main combustion chamber in this manner enables hot gas jets to penetrate deeper into the main combustion chamber, causing more evenly distributed ignition, when compared to engines that do not employ pre-chamber schemes.

One example approach shown by Attard in U.S. 2012/0103302 includes a system with an ignition assembly with a pre-chamber, a fuel injector, and a spark plug that is mounted in the cylinder head above the main combustion chamber. Attard's pre-chamber ignition system achieves fast burn in fuel-lean conditions. However, the inventors have recognized several potential drawbacks with Attard's system and other pre-chamber assemblies. For instance, residual burned gases may dwell in the pre-chamber, diluting the air/fuel mixture in subsequent combustion cycles. As a result, combustion efficiency is decreased and emissions are associatively increased. Moreover, the supplemental fuel injected into the pre-chamber may not enhance ignitibility or burn rate during stoichiometric conditions while increasing a packaging size of the pre-chamber. Therefore, Attard's system may only achieve efficiency gains during a limited window of engine operation.

However, the inventors have identified the above described issues and developed a way to at least partially solve them. In one example, the issues described above may be addressed by a system comprising a pre-chamber arranged in a volume of a primary combustion chamber, wherein the pre-chamber comprises a plurality of slots and a plurality of flaps shaped identically to the plurality of slots. In this way, the pre-chamber may receive a sufficient amount of gas flow to expel residual gases from a previous combustion cycle via a bottom hole arranged in the pre-chamber.

In one example, the pre-chamber is a passive pre-chamber, wherein only an ignition device is arranged within the pre-chamber. As such, the pre-chamber may be free of an injector. The pre-chamber may receive air and/or fuel from the primary combustion chamber wherein residual gases are pushed out of the pre-chamber and into the primary combustion chamber. The pre-chamber may then expel combustion air/fuel mixtures into the primary combustion chamber, wherein a shape of the openings (e.g., the slots) and orientation of the pre-chamber may enhance a flame front propagation and a more uniform and faster burn throughout the primary combustion chamber.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 4 illustrates a first example arrangement of a plurality of pre-chambers within a primary combustion chamber relative to intake and exhaust ports; and FIGS. 5A and 5B illustrate a second example arrangement of a pre-chamber within the primary combustion chamber relative to intake and exhaust ports.

DETAILED DESCRIPTION

Figure 1:
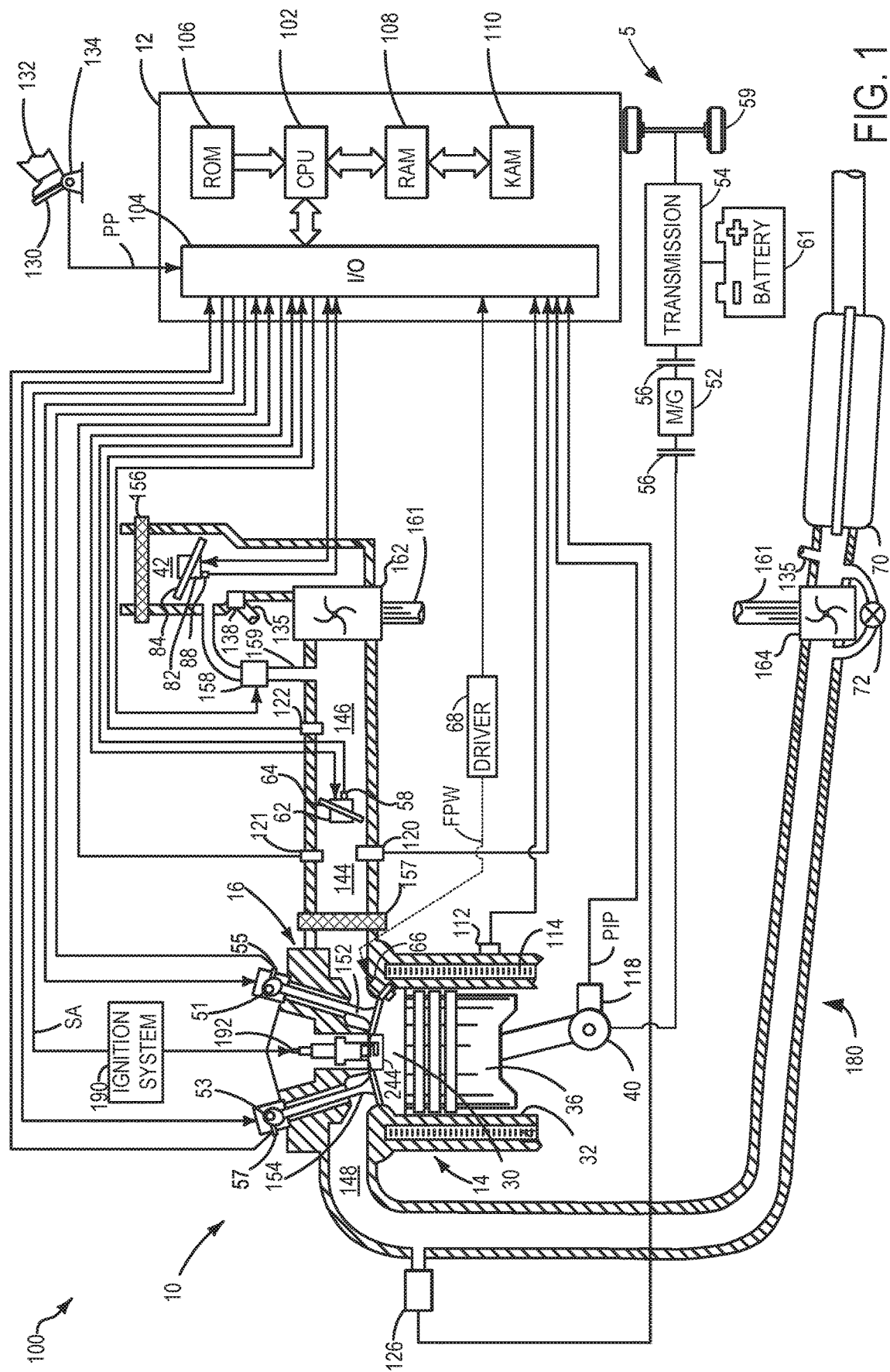
FIG. 1 illustrates an engine of a hybrid vehicle.
Figure 2:
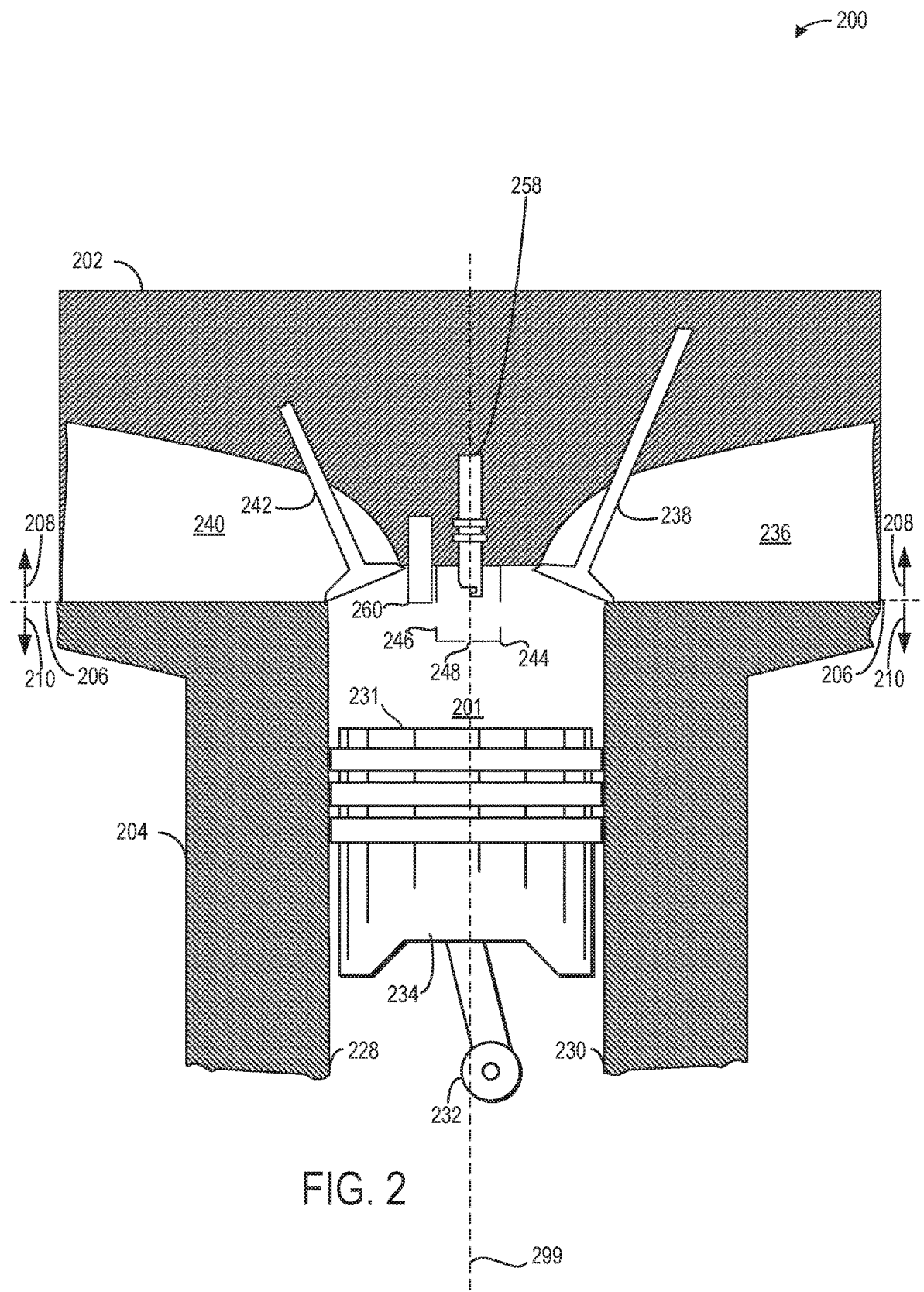
FIG. 2 illustrates a pre-chamber of the engine, the pre-chamber configured to direct residual exhaust gases into a primary combustion chamber.
Figure 3B:
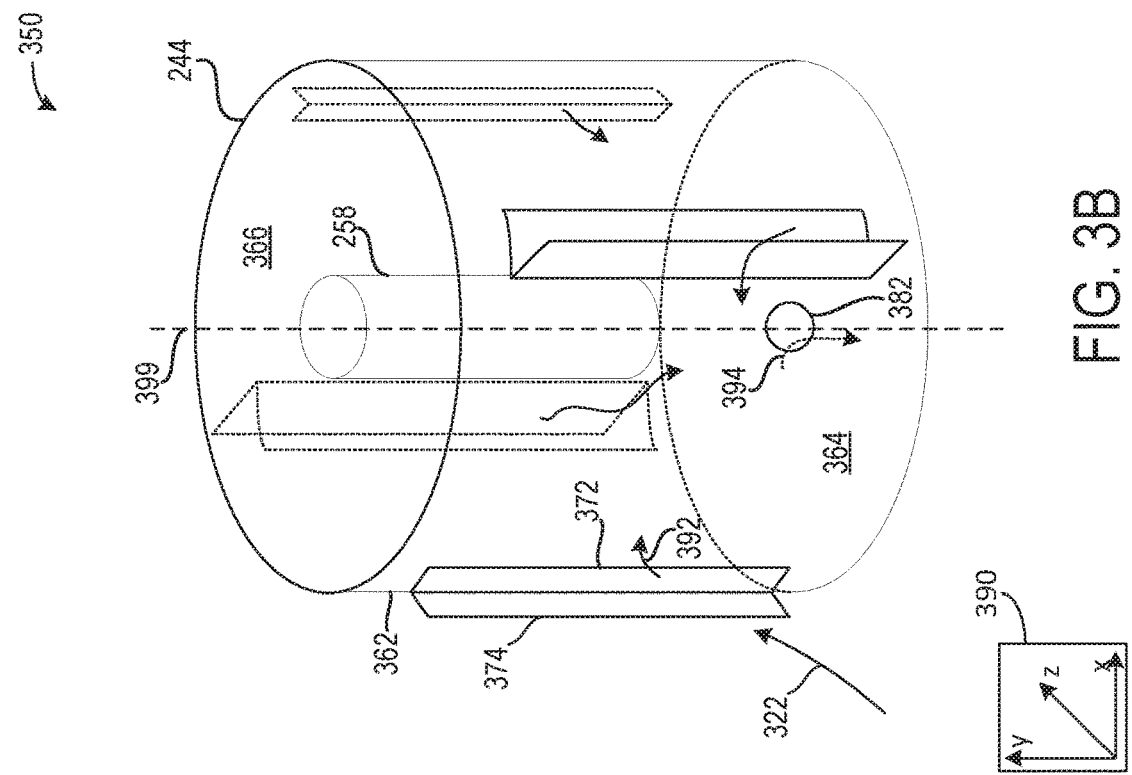
FIG. 3B illustrates features of the pre-chamber for capturing and adjusting a flow direction of gases from the intake ports.
Figure 3A:
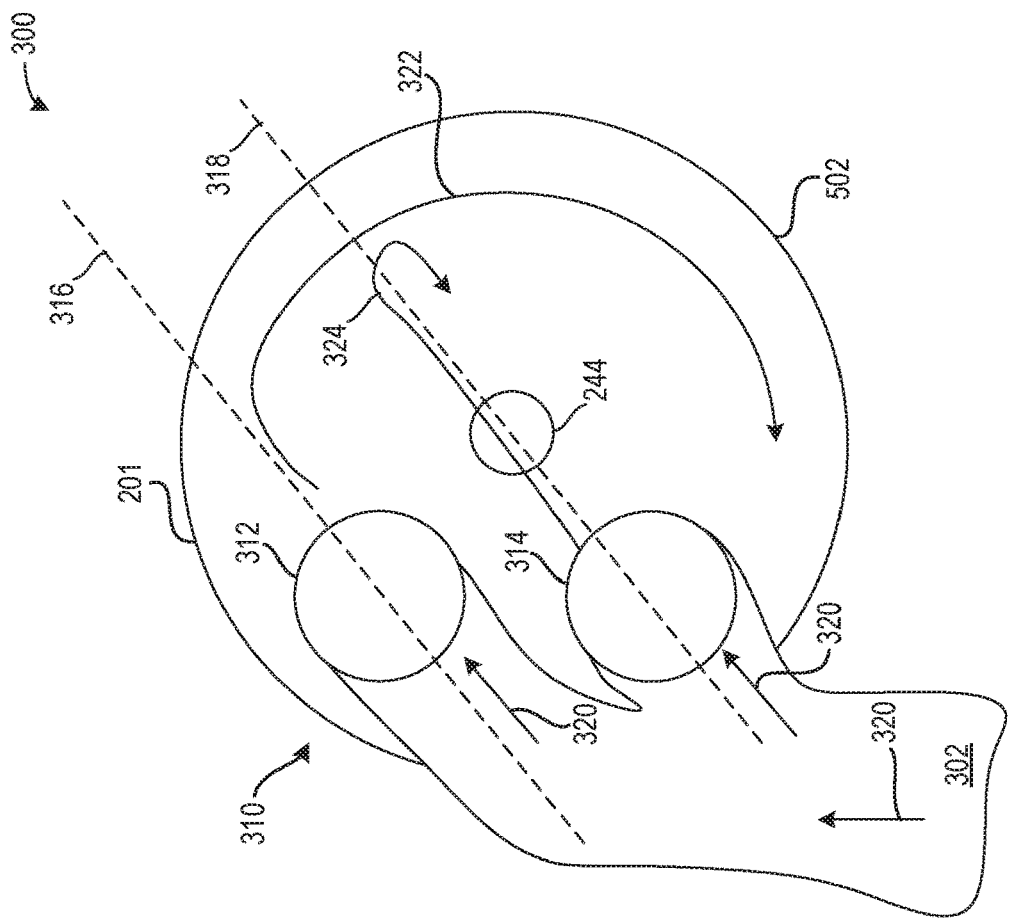
FIG. 3A illustrates an example orientation of a plurality of intake ports relative to the pre-chamber.

The following description relates to systems and methods for a pre-chamber of a primary combustion chamber. The primary combustion chamber comprises a piston configured to oscillate therein, as illustrated in FIG. 1. The pre-chamber is arranged within or above a volume of the primary combustion chamber, wherein the pre-chamber comprises walls for separating a pre-chamber volume from the primary combustion chamber volume, as shown in FIG. 2. The pre-chamber comprises a plurality of features for adjusting an intake air flow from a plurality of intake ports configured to direct intake air flow along a cylinder head central axis and a tangential axis, as illustrated in FIGS. 3A, 3B. A first example arrangement of more than one pre-chamber within the primary combustion chamber relative to intake and exhaust ports is illustrated in FIG. 4. A second example arrangement of a single pre-chamber being arranged within the primary combustion chamber relative to intake and exhaust ports is illustrated in FIGS. 5A and 5B.

In the embodiments below of the pre-chamber, features may be introduced to assist in the expulsion of residual gases from a volume of the pre-chamber to a volume of the primary combustion chamber during a current combustion event. Herein, residual gases refer to gases from a previous combustion cycle that were not expelled and may be held within the pre-chamber. As such, the residual gases may include air, exhaust gas, unburned hydrocarbons, and combustion byproducts. Furthermore, a combustion cycle includes an intake stroke, a compression stroke, an expansion stroke, and an exhaust stroke. A current combustion cycle ends and a next combustion cycle begins on a transition of a piston from the exhaust stroke to an intake stroke.

FIG. 1 depicts an engine system 100 for a vehicle. The vehicle may be an on-road vehicle having drive wheels which contact a road surface. Engine system 100 includes engine 10 which comprises a plurality of cylinders. FIG. 1 describes one such cylinder or combustion chamber in detail. The various components of engine 10 may be controlled by electronic engine controller 12.

Engine 10 includes a cylinder block 14 including at least one cylinder bore, and a cylinder head 16 including intake valves 152 and exhaust valves 154. In other examples, the cylinder head 16 may include one or more intake ports and/or exhaust ports in examples where the engine 10 is configured as a two-stroke engine. The cylinder block 14 includes cylinder walls 32 with piston 36 positioned therein and connected to crankshaft 40. Thus, when coupled together, the cylinder head 16 and cylinder block 14 may form one or more combustion chambers. As such, the combustion chamber 30 volume is adjusted based on an oscillation of the piston 36. Combustion chamber 30 may also be referred to herein as cylinder 30. The combustion chamber 30 is shown communicating with intake manifold 144 and exhaust manifold 148 via respective intake valves 152 and exhaust valves 154. Each intake and exhaust valve may be operated by an intake cam 51 and an exhaust cam 53. Alternatively, one or more of the intake and exhaust valves may be operated by an electromechanically controlled valve coil and armature assembly. The position of intake cam 51 may be determined by intake cam sensor 55. The position of exhaust cam 53 may be determined by exhaust cam sensor 57. Thus, when the valves 152 and 154 are closed, the combustion chamber 30 and cylinder bore may be fluidly sealed, such that gases may not enter or leave the combustion chamber 30.

Combustion chamber 30 may be formed by the cylinder walls 32 of cylinder block 14, piston 36, and cylinder head 16. Cylinder block 14 may include the cylinder walls 32, piston 36, crankshaft 40, etc. Cylinder head 16 may include one or more fuel injectors such as fuel injector 66, one or more intake valves 152, and one or more exhaust valves such as exhaust valves 154. The cylinder head 16 may be coupled to the cylinder block 14 via fasteners, such as bolts and/or screws. In particular, when coupled, the cylinder block 14 and cylinder head 16 may be in sealing contact with one another via a gasket, and as such the cylinder block 14 and cylinder head 16 may seal the combustion chamber 30, such that gases may only flow into and/or out of the combustion chamber 30 via intake manifold 144 when intake valves 152 are opened, and/or via exhaust manifold 148 when exhaust valves 154 are opened. In some examples, only one intake valve and one exhaust valve may be included for each combustion chamber 30. However, in other examples, more than one intake valve and/or more than one exhaust valve may be included in each combustion chamber 30 of engine 10.

In some examples, each cylinder of engine 10 may include a spark plug 192 for initiating combustion. Ignition system 190 can provide an ignition spark to cylinder 14 via spark plug 192 in response to spark advance signal SA from controller 12, under select operating modes. However, in some embodiments, spark plug 192 may be omitted, such as where engine 10 may initiate combustion by auto-ignition or by injection of fuel as may be the case with some diesel engines.

Fuel injector 66 may be positioned to inject fuel directly into combustion chamber 30, which is known to those skilled in the art as direct injection. Fuel injector 66 delivers liquid fuel in proportion to the pulse width of signal FPW from controller 12. Fuel is delivered to fuel injector 66 by a fuel system (not shown) including a fuel tank, fuel pump, and fuel rail. Fuel injector 66 is supplied operating current from driver 68 which responds to controller 12. In some examples, the engine 10 may be a gasoline engine, and the fuel tank may include gasoline, which may be injected by injector 66 into the combustion chamber 30. However, in other examples, the engine 10 may be a diesel engine, and the fuel tank may include diesel fuel, which may be injected by injector 66 into the combustion chamber. Further, in such examples where the engine 10 is configured as a diesel engine, the engine 10 may include a glow plug to initiate combustion in the combustion chamber 30.

In one example, the combustion chamber 30 is a primary combustion chamber further comprising a pre-chamber 244. The spark plug 192 may be arranged to ignite an air/fuel mixture arranged within only the pre-chamber. FIG. 2 illustrates the primary combustion chamber and the pre-chamber in greater detail.

Intake manifold 144 is shown communicating with throttle 62 which adjusts a position of throttle plate 64 to control airflow to engine cylinder 30. This may include controlling airflow of boosted air from intake boost chamber 146. In some embodiments, throttle 62 may be omitted and airflow to the engine may be controlled via a single air intake system throttle (AIS throttle) 82 coupled to air intake passage 42 and located upstream of the intake boost chamber 146. In yet further examples, AIS throttle 82 may be omitted and airflow to the engine may be controlled with the throttle 62.

In some embodiments, engine 10 is configured to provide exhaust gas recirculation, or EGR. When included, EGR may be provided as high-pressure EGR and/or low-pressure EGR. In examples where the engine 10 includes low-pressure EGR, the low-pressure EGR may be provided via EGR passage 135 and EGR valve 138 to the engine air intake system at a position downstream of air intake system (AIS) throttle 82 and upstream of compressor 162 from a location in the exhaust system downstream of turbine 164. EGR may be drawn from the exhaust system to the intake air system when there is a pressure differential to drive the flow. A pressure differential can be created by partially closing AIS throttle 82. Throttle plate 84 controls pressure at the inlet to compressor 162. The AIS may be electrically controlled and its position may be adjusted based on optional position sensor 88.

Ambient air is drawn into combustion chamber 30 via intake passage 42, which includes air filter 156. Thus, air first enters the intake passage 42 through air filter 156. Compressor 162 then draws air from air intake passage 42 to supply boost chamber 146 with compressed air via a compressor outlet tube (not shown in FIG. 1). In some examples, air intake passage 42 may include an air box (not shown) with a filter. In one example, compressor 162 may be a turbocharger, where power to the compressor 162 is drawn from the flow of exhaust gases through turbine 164. Specifically, exhaust gases may spin turbine 164 which is coupled to compressor 162 via shaft 161. A wastegate 72 allows exhaust gases to bypass turbine 164 so that boost pressure can be controlled under varying operating conditions. Wastegate 72 may be closed (or an opening of the wastegate may be decreased) in response to increased boost demand, such as during an operator pedal tip-in. By closing the wastegate, exhaust pressures upstream of the turbine can be increased, raising turbine speed and peak power output. This allows boost pressure to be raised. Additionally, the wastegate can be moved toward the closed position to maintain desired boost pressure when the compressor recirculation valve is partially open. In another example, wastegate 72 may be opened (or an opening of the wastegate may be increased) in response to decreased boost demand, such as during an operator pedal tip-out. By opening the wastegate, exhaust pressures can be reduced, reducing turbine speed and turbine power. This allows boost pressure to be lowered.

However, in alternate embodiments, the compressor 162 may be a supercharger, where power to the compressor 162 is drawn from the crankshaft 40. Thus, the compressor 162 may be coupled to the crankshaft 40 via a mechanical linkage such as a belt. As such, a portion of the rotational energy output by the crankshaft 40, may be transferred to the compressor 162 for powering the compressor 162.

Compressor recirculation valve 158 (CRV) may be provided in a compressor recirculation path 159 around compressor 162 so that air may move from the compressor outlet to the compressor inlet so as to reduce a pressure that may develop across compressor 162. A charge air cooler 157 may be positioned in boost chamber 146, downstream of compressor 162, for cooling the boosted aircharge delivered to the engine intake. However, in other examples as shown in FIG. 1, the charge air cooler 157 may be positioned downstream of the electronic throttle 62 in an intake manifold 144. In some examples, the charge air cooler 157 may be an air to air charge air cooler. However, in other examples, the charge air cooler 157 may be a liquid to air cooler.

In the depicted example, compressor recirculation path 159 is configured to recirculate cooled compressed air from upstream of charge air cooler 157 to the compressor inlet. In alternate examples, compressor recirculation path 159 may be configured to recirculate compressed air from downstream of the compressor and downstream of charge air cooler 157 to the compressor inlet. CRV 158 may be opened and closed via an electric signal from controller 12. CRV 158 may be configured as a three-state valve having a default semi-open position from which it can be moved to a fully-open position or a fully-closed position.

Universal Exhaust Gas Oxygen (UEGO) sensor 126 is shown coupled to exhaust manifold 148 upstream of emission control device 70. Alternatively, a two-state exhaust gas oxygen sensor may be substituted for UEGO sensor 126. Emission control device 70 may include multiple catalyst bricks, in one example. In another example, multiple emission control devices, each with multiple bricks, can be used. While the depicted example shows UEGO sensor 126 upstream of turbine 164, it will be appreciated that in alternate embodiments, UEGO sensor may be positioned in the exhaust manifold downstream of turbine 164 and upstream of emission control device 70. Additionally or alternatively, the emission control device 70 may comprise a diesel oxidation catalyst (DOC) and/or a diesel cold-start catalyst, a particulate filter, a three-way catalyst, a $NO_x$ trap, selective catalytic reduction device, and combinations thereof. In some examples, a sensor may be arranged upstream or downstream of the emission control device 70, wherein the sensor may be configured to diagnose a condition of the emission control device 70.

Controller 12 is shown in FIG. 1 as a microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an input device 130 for sensing input device pedal position (PP) adjusted by a vehicle operator 132; a knock sensor for determining ignition of end gases (not shown); a measurement of engine manifold pressure (MAP) from pressure sensor 121 coupled to intake manifold 144; a measurement of boost pressure from pressure sensor 122 coupled to boost chamber 146; an engine position sensor from a Hall effect sensor 118 sensing crankshaft 40 position; a measurement of air mass entering the engine from sensor 120 (e.g., a hot wire air flow meter); and a measurement of throttle position from sensor 58. Barometric pressure may also be sensed (sensor not shown) for processing by controller 12. In a preferred aspect of the present description, Hall effect sensor 118 produces a predetermined number of equally spaced pulses every revolution of the crankshaft from which engine speed (RPM) can be determined. The input device 130 may comprise an accelerator pedal and/or a brake pedal. As such, output from the position sensor 134 may be used to determine the position of the accelerator pedal and/or brake pedal of the input device 130, and therefore determine a desired engine torque. Thus, a desired engine torque as requested by the vehicle operator 132 may be estimated based on the pedal position of the input device 130.

In some examples, vehicle 5 may be a hybrid vehicle with multiple sources of torque available to one or more vehicle wheels 59. In other examples, vehicle 5 is a conventional vehicle with only an engine, or an electric vehicle with only electric machine(s). In the example shown, vehicle 5 includes engine 10 and an electric machine 52. Electric machine 52 may be a motor or a motor/generator. Crankshaft 40 of engine 10 and electric machine 52 are connected via a transmission 54 to vehicle wheels 59 when one or more clutches 56 are engaged. In the depicted example, a first clutch 56 is provided between crankshaft 40 and electric machine 52, and a second clutch 56 is provided between electric machine 52 and transmission 54. Controller 12 may send a signal to an actuator of each clutch 56 to engage or disengage the clutch, so as to connect or disconnect crankshaft 40 from electric machine 52 and the components connected thereto, and/or connect or disconnect electric machine 52 from transmission 54 and the components connected thereto. Transmission 54 may be a gearbox, a planetary gear system, or another type of transmission. The powertrain may be configured in various manners including as a parallel, a series, or a series-parallel hybrid vehicle.

Electric machine 52 receives electrical power from a traction battery 61 to provide torque to vehicle wheels 59. Electric machine 52 may also be operated as a generator to provide electrical power to charge battery 61, for example during a braking operation.

The controller 12 receives signals from the various sensors of FIG. 1 and employs the various actuators of FIG. 1 to adjust engine operation based on the received signals and instructions stored on a memory of the controller. For example, coolant flow to the primary combustion chamber 30 and to a pre-chamber described below with respect to FIG. 2 may be adjusted based on feedback from at least a temperature sensor of the pre-chamber and/or its coolant circuit.

Turning now to FIG. 2, it shows an example of a single cylinder of an engine 200. In one example, the engine 200 may be a non-limiting example of the engine 10 of FIG. 1. As such, the engine 200 may be included within the embodiment of a hybrid vehicle, such as vehicle 6 of FIG. 1.

The engine 200 comprises a primary combustion chamber 201. The primary combustion chamber 201 may be a non-limiting example of the combustion chamber 30 of FIG. 1. The primary combustion chamber 201 may be defined via a cylinder head 202, a first interior cylinder wall 228, a second interior cylinder wall 230, and a piston surface 231. It will be appreciated that the first interior cylinder wall 228 and the second interior cylinder wall 230 may be a single, continuous wall. However, in the example of FIG. 2, the cross-section divides the walls into two pieces. In this way, a primary combustion chamber volume may be defined by a cylinder head 202, the first interior cylinder wall 228, the second interior cylinder wall 230, and the piston surface 231. The primary combustion chamber volume may be adjusted via oscillation of the piston 234.

The piston surface 231 corresponds to an upper surface of the piston 234, wherein the piston 234 may be configured to oscillate within the primary combustion chamber 201 via a crankshaft 232. The crankshaft may rotate as a fuel air mixture within the primary combustion chamber 201 combusts and presses against the piston surface 231 and pushes the piston 234 downward. This action may result in motion of the vehicle.

To enhance combustion properties, such as combustion distribution, a pre-chamber 244 is fluidly coupled to the primary combustion chamber 201 via a plurality of passages including a plurality of side openings 246 and a bottom hole 248. The pre-chamber 244 may comprise a cylindrical shape, wherein the plurality of side openings 246 are arranged on curved surfaces of the pre-chamber and the bottom hole 248 is arranged on a bottom, flat surface of the pre-chamber 244.

The pre-chamber 244 further comprises an ignition device 258 arranged along a central axis 299 of the pre-chamber 244. In one example, the central axis 299 is also a central axis of the primary combustion chamber 201, wherein the piston 231 oscillates along the central axis 299 to adjust a volume of the primary combustion chamber 201 without adjusting a volume of the pre-chamber 244.

In one example, the primary combustion chamber 201 is free of an ignition device, but comprises its own fuel injector such as fuel injector 66 of FIG. 1 or fuel injector 260. Additionally or alternatively, the primary combustion chamber 201 may be configured to receive a port injection, wherein a fuel injector is arranged in and intake port upstream of the intake valve 238. In one example, the primary combustion chamber 201 may comprise a port injector and a direct injector. Fuel injector 260 is merely one example positioning of a fuel injector positioned to inject directly into the primary combustion chamber 201. As illustrated, the fuel injector 260 is directly adjacent to the pre-chamber 244 while being positioned to inject into a portion of the primary combustion chamber 201 adjacent to the pre-chamber 244. In this way, the pre-chamber 244 may house a portion of the ignition device 258 such that the ignition device 258 provides a spark to an interior volume of the pre-chamber 244 while the primary combustion chamber 201 is configured to directly receive an injection from the fuel injector 260. As such, the pre-chamber 244 is a passive pre-chamber in the example of FIG. 2.

The primary combustion chamber 201 may receive air flow from an air intake passage 236 when an intake valve 238 is in an open position. The pre-chamber 244 may receive air from the primary combustion chamber 201 via one or more of the plurality of air paths 248 and the wire mesh 250. The primary combustion chamber 201 may be fluidly coupled to an exhaust passage 240 when an exhaust valve 242 is in an open position. Exhaust gases along with other combustion artifacts (e.g., air, unburned fuel, etc.) may be expelled to the exhaust passage 240 from the primary combustion chamber 201. When the intake valve 238 and the exhaust valve 242 are in closed positions, such as the positions illustrated, the primary combustion chamber 201, and the pre-chamber 244 may be fluidly sealed from the intake passage 236 and the exhaust passage 240.

In this way, the primary combustion chamber 201 is a separate volume of space relative to the pre-chamber 244, wherein a volume of the primary combustion chamber 201 is greater than a volume of the pre-chamber 244. The pre-chamber 244 may receive intake gases from the primary combustion chamber 201 and release an at least partially ignited fuel/air mixture to the primary combustion chamber 201 to initiate combustion within the primary combustion chamber 201.

As illustrated, the pre-chamber 244 is arranged within a volume of the primary combustion chamber 201. More specifically, dashed line 206 illustrates a divide between the cylinder head 202 and the cylinder block 204. Arrow 208 illustrates a cylinder head side and arrow 210 illustrates a cylinder block side. The ignition device 258 extends from the cylinder head side and into the volume of the pre-chamber 244 on the cylinder block side. The pre-chamber 244 is arranged in a position to receive an extreme end of the ignition device 258 such that it sparks within a volume of the pre-chamber 244. In one example, an entire volume of the pre-chamber 244 is arranged on the cylinder block side of the engine 201. However, the volume of the pre-chamber 244 is fixed and separated from the volume of the primary combustion chamber 201 such that oscillation of the piston 234 does not result in a change in volume of the pre-chamber 244.

Turning now to FIG. 3A, it shows an embodiment 300 of a position of a plurality of intake ports 310 relative to the pre-chamber 244. The plurality of ports 310 comprises a first port 312 and a second port 314. The first port 312 and the second port 314 may receive intake air from an intake passage 302. The intake passage 302 may bifurcate from a single passage to the first and second ports 312, 314 so that intake air 320 flowing through the intake passage 302 may reach each of the first and second ports 312, 314.

The first port 312 may direct a first flow 322 into the primary combustion chamber 201 and the second port 314 may direct a second flow 324 into the primary combustion chamber 201. The first flow 322 may be parallel to a first axis, which is a tangential axis 316 before following a curvature of walls of the primary combustion chamber 201. In one example, the first flow 322 is a swirling flow. The first port 312 may be configured to supply a threshold swirling ratio, wherein the threshold swirling ratio is based on a combustion stability enhanced via the pre-chamber 244. As such, a size and/or shape of the first port 312 may be adjusted for different operations based on a desired amount of swirling needed for the pre-chamber 244 to enhance combustion stability.

The tangential axis 316 is parallel to a tangential line of the primary combustion chamber 201. Additionally or alternatively, the tangential axis 316 may be parallel to or slightly angled to a second axis, which is a head center line axis 318. The head center line axis 318 may be parallel to and directly below a central axis of the cylinder head (e.g., cylinder head 202 of FIG. 2). The second port 314 may be configured to expel the second flow 324 into the primary combustion chamber 201 in a direction parallel to the head center line axis 318. The second flow 324 may be a tumble flow, wherein the second port 314 is configured to provide a threshold amount of tumble flow to promote enhanced combustion efficiency and low emissions. In this way, each of the first port 312 and the second port 314 are shaped and positioned to expel intake air 320 along different paths of the primary combustion chamber 201 to provide a desired amount of swirling and tumbling air flows to promote efficient and robust combustion.

As illustrated, the second flow 324 may flow directly toward the pre-chamber 244 and to a portion of the first flow 322 away from the first axis 316 before turning and flowing back along the head center line axis 318. That is to say, the second flow 324 flows parallel to the head center line axis 318 as it exits the second port 314 in an original direction, contacts the first flow 322 and turns to flow again parallel to the head center line axis 318, wherein the direction of flow following the turn is opposite the original direction in which the second flow 324 left the second port 314. As such, the first flow 322 and the second flow 324 may at least partially mix.

Turning to FIG. 3B, it shows a view 350 of the pre-chamber 244. The pre-chamber 244 comprises one or more features cut into its surfaces to enhance gas exchange and air flow (e.g., the slots). As illustrated in the embodiment of FIG. 3B, the pre-chamber 244 comprises only the spark plug 258. As such, the pre-chamber 258 may be a passive pre-chamber free of a fuel injector. The features of the pre-chamber 244 in combination with the arrangement and configuration of the intake ports may allow an air/fuel mixture from within the primary combustion chamber to flow into a volume of the pre-chamber 244, wherein the spark plug 258 may combust the mixture.

The pre-chamber 244 comprises a protection tube 360 comprises a circumferential wall 362, a bottom wall 364, and a top wall 366. The top wall 366 may be opposite the bottom wall 364 and separated therefrom via the circumferential wall 362. The spark plug 258 may extend through the top wall 366 and into an interior volume of the pre-chamber 244. The circumferential wall 362 may comprise one or more slots 372. In one example, the one or more slots 372 are a plurality of slots 372 comprising at least two slots. As shown, the plurality of slots 372 are arranged symmetrically about the circumferential wall 362. However, it will be appreciated that the plurality of slots 372 may be arranged asymmetrically without departing from the scope of the present disclosure. The plurality of slots 372 may be shaped and sized identically to one another. Additionally or alternatively, while there are four of the plurality of slots 372 illustrated in the embodiment of FIG. 3B, there may be as few as two and as many as 20 of the slots without departing from the scope of the present disclosure.

Each slot of the plurality of slots 372 comprises a substantially rectangular shape. In one example, to shape each slot, three sides of a rectangle are cut into the circumferential wall 362, wherein the three sides include two short sides and one long side of the rectangle. The surface of the circumferential wall 362 may be pressed outward, away from the interior volume of the pre-chamber 244 and into the volume of the primary combustion chamber. As such, a plurality of flaps 374 may be formed, each flap comprising a corresponding slot. In this way, each flap represents a solid surface impervious to gas flow such that gas may not flow through the flap whereas each slot of the plurality of slots 372 represents an opening through which gases may flow through. As such, the plurality of slots 372 may fluidly couple an interior volume of the pre-chamber 244 to the primary combustion chamber volume.

The pre-chamber 244 further comprises a bottom hole 376 arranged on the bottom wall 364. The bottom hole 376 may be positioned such that its geometric center is aligned with a geometric center of each of the spark plug 258 and the pre-chamber 244, as illustrated via central axis 399. A size of the bottom hole 376 may be less than a size of each slot of the plurality of slots 372. The bottom hole 382 may comprise a circle shape. In this way, a shape of the bottom hole 382 is different than a shape of the plurality of slots 372. A size of the bottom hole 372 may be adjusted based on a desired amount of residual gas output flow through the pre-chamber 244, as will be described in greater detail herein.

As illustrated, the plurality of slots 372 extend through an entire thickness of the circumferential wall 362. The plurality of slots 372 are illustrated as linear, wherein linear slots are parallel to a single plane along a three-axis system, such as axis system 390. Additionally or alternatively, the plurality of slots 372 may be curved, as illustrated in FIG. 5B, such that helical or swirling turbulent jet flow may exit the pre-chamber 244 to enhance flame propagation.

Flow through the pre-chamber 244 is illustrated via arrows. As illustrated, the first flow 322 (e.g., the swirling flow 322) may be captured by the plurality of flaps 374, wherein the swirling flow is directed through the plurality of slots 372 and into the interior volume of the pre-chamber 244, as illustrated via arrows 392. As the swirling flow enters the interior volume of the pre-chamber 244, residual gases, illustrated via dashed line arrows 394, may exit the interior volume of the pre-chamber 244 and enter the primary combustion chamber volume. In one example, the residual gases may mix with the tumble flow (e.g., the second flow 324 of FIG. 3A) as it exits the bottom hole 382. As the residual gases exit, a fuel injector may inject fuel into the primary chamber combustion volume, wherein the swirling and tumbling intake gases may mix therewith. The pre-chamber 244 may capture a portion of the air/fuel mixture in the primary combustion chamber via the flaps 374, wherein the spark plug 258 may be activated to ignite the mixture and advance combustion.

In one example, as the intake valve open and intake air flows through the first and second intake ports, the intake air may flow into the interior volume of the pre-chamber 244 via the plurality of slots 372. This first exchange may result in residual gases being pushed out of the interior volume of the pre-chamber 244 and into the primary combustion chamber via the bottom hole 382. As the combustion cycle progresses and a fuel injection within the primary combustion chamber has occurred, an air/fuel mixture may flow into the pre-chamber 244, which may be enhanced via the tumble and swirling flows and ignited via the ignition device 258 positioned to provide a spark within the interior volume of the pre-chamber 244. The mixture may be combusted and jetted (e.g., expelled) into the primary combustion chamber via one or more of the plurality of slots 372 and the bottom hole 382.

Turning now to FIG. 4, it shows a first embodiment 400 of the primary combustion chamber 201. The primary combustion chamber 201 comprises a plurality of intake ports 404 and a plurality of exhaust ports 406. In one example, the intake ports 404 may be similar to the intake ports 310 of FIG. 3A. The first embodiment 400 comprises the pre-chamber 244 arranged equidistantly between the intake ports 404 and the exhaust ports 406. In the example of the first embodiment 400, the pre-chamber 244 is a first pre-chamber 244, wherein the first embodiment 400 further comprises a second pre-chamber 442 and a third pre-chamber 444. The second pre-chamber 442 may be arranged between adjacent exhaust ports of the plurality of exhaust ports 406. The third pre-chamber 444 may be arranged between adjacent intake ports of the plurality of intake ports 404. As such, the first pre-chamber 244 may be arranged between the second pre-chamber 442 and the third pre-chamber 444 aligned along a common axis 490.

The first pre-chamber 244, the second pre-chamber 442, and the third pre-chamber 444 may be shaped substantially identically to one another, similar to the pre-chamber 244 illustrated in FIG. 3B. However, adjacent pre-chambers of the first, second, and third pre-chambers may be oriented differently to promote enhanced flame propagation for a more uniform and faster burn throughout the primary combustion chamber. More specifically, the first pre-chamber 244 is oriented in a first orientation and the second pre-chamber 442 and the third pre-chamber 444 are oriented in a second orientation, different than the first orientation. As illustrated, the first pre-chamber 244 may expel combusted gases parallel to and normal to the common axis 490. The second pre-chamber 442 and the third pre-chamber 444 may expel combusted gases angled to, and not normal or parallel to, the common axis 490. As such, the gases may not overlap with one another.

In some examples of the first embodiment 400, there may be only two pre-chambers or four or more pre-chamber. In one example where there are only two pre-chambers, the second and third pre-chambers may be included and the first pre-chamber 244 may be omitted.

Turning now to FIG. 5A, it shows a second embodiment 500 comprising a primary combustion chamber 501, which may be a non-limiting example of the primary combustion chamber 201 of FIG. 2. The primary combustion chamber 501 comprises a plurality of intake ports 504 and a plurality of exhaust ports 506. The primary combustion chamber 501 further comprises a pre-chamber 544 arranged equidistantly from each of the plurality of intake ports 504 and the plurality of exhaust ports 506. The pre-chamber 544 is configured to expel flows 546, wherein each flow is directed to a different intake port or exhaust port. As illustrated, the flows 546 comprises a crescent shape, however, it will be appreciated that the flows may comprise C-shape, J-shape, D-shape, and other similar shapes without departing from a scope of the present disclosure.

Turning to FIG. 5B, it shows a cross-section 550 of the pre-chamber 544, wherein passages 554 are shaped into a protection tube 552 of the pre-chamber 544. The passages 554 may comprise a curved shape, wherein the curved shape directs the flows 546 to comprise the crescent shape. As such, the passages 554, which are curved, fluidly couple the interior volume of the pre-chamber 544 to the primary combustion chamber volume and adjust the flow therethrough to enter along a first axis and exit along a second axis different than the first so that the flows 546 are swirling and/or helical to enhance combustion. In one example, the pre-chamber 544 is similar to the pre-chamber 244 of FIG. 3B, wherein the passages 554 are used instead of the slots 372. As such, the pre-chamber 544 may still comprise the bottom hole.

In this way, a pre-chamber, which may be a passive pre-chamber, may comprise a plurality of openings for expelling residual exhaust gases while ejecting a jet of combustion air and fuel back into a primary combustion chamber at a plurality of angles. The openings may include a bottom hole and a plurality of slots comprising corresponding flaps for capturing primary combustion chamber gases. The technical effect of arranging the pre-chamber is to enhance flame propagation and increase a burn rate before the flame touches a surface of the primary combustion chamber while also expelling an increased amount of residual gases relative to previous examples of passive pre-chambers. By doing this, efficiency may be increased.

FIGS. 1-5B show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation).

An example of a system, comprises a pre-chamber arranged in a volume of a primary combustion chamber, wherein the pre-chamber comprises a plurality of slots and a plurality of flaps shaped identically to the plurality of slots.

A first example of the system further includes where each of the plurality of slots and the plurality of flaps comprises a rectangular shape.

A second example of the system optionally including the first examples, further includes where each flap of the plurality of flaps extends from a long edge of a slot of the plurality of slots.

A third example of the system, optionally including one or more of the previous examples, further includes where the plurality of flaps and the plurality of slots are arranged symmetrically about a protection tube of the primary combustion chamber.

A fourth example of the system, optionally including one or more of the previous examples, further includes where the plurality of slots extends through an entire thickness of the protection tube.

A fifth example of the system, optionally including one or more of the previous examples, further includes where the plurality of slots is linear or curved.

A sixth example of the system, optionally including one or more of the previous examples, further includes where the pre-chamber further comprises a hole arranged at a bottom surface of the pre-chamber, equidistant to each slot of the plurality of slots, and wherein there are no other inlets or outlets in the pre-chamber except for the plurality of slots and the hole.

A seventh example of the system, optionally including one or more of the previous examples, further includes where the plurality of slots fluidly couples an interior volume of the pre-chamber to the primary combustion chamber.

An eighth example of the system, optionally including one or more of the previous examples, further includes where the pre-chamber comprises an ignition device and is free of a fuel injector.

An example of an engine, comprises a primary combustion chamber comprising a piston and a pre-chamber, wherein the piston is configured to adjust a volume of only the primary combustion chamber, wherein the pre-chamber comprises a plurality of slots and a bottom hole fluidly coupling an interior volume of the pre-chamber to the volume of the primary combustion chamber.

A first example of the engine further includes where a first intake port is configured to provide a swirling flow and a second intake port is configured to provide a tumble flow, wherein the swirling flow is configured to travel along a circumference of the primary combustion chamber and into the pre-chamber via the plurality of slots.

A second example of the engine, optionally including the first example, further includes the tumble flow is configured to travel along a head center line axis before contact the swirling flow and turning to flow along the head center line axis in an opposite direction relative to an original direction of travel.

A third example of the engine, optionally including one or more of the previous examples, further includes where the pre-chamber is configured to expel residual gases from the interior volume as the swirling flow enters the interior volume via the plurality of slots.

A fourth example of the engine, optionally including one or more of the previous examples, further includes where the pre-chamber is a first pre-chamber, further comprising a second pre-chamber identical to the first pre-chamber.

A fifth example of the engine, optionally including one or more of the previous examples, further includes where the first pre-chamber is oriented in a first orientation and the second pre-chamber is oriented in a second orientation, wherein the second orientation is identical to or different than the first orientation.

An example of a system, comprises a primary combustion chamber comprising a piston configured to oscillate therein, a plurality of intake ports configured to flow intake air into the primary combustion chamber, wherein the plurality of intake ports comprises a first intake port configured to expel intake air parallel to a transverse axis and a second intake port configured to expel intake air parallel to a head center line axis, and a pre-chamber arranged within a volume of the primary combustion chamber, the pre-chamber comprising a cylindrical shape, wherein a bottom hole is arranged on a bottom circular surface and a plurality of slots is arranged on a circumferential wall.

A first example of the system further includes where each of the plurality of slots comprises a flap, wherein the flap is configured to direct gases into the plurality of slots.

A second example of the system, optionally including the first example, further includes where the pre-chamber is free of an injector, further comprising where an ignition device is positioned to provide a spark within an interior volume of the pre-chamber, wherein the ignition device is aligned with the bottom hole along a central axis.

A third example of the system, optionally including one or more of the previous examples, further includes where the pre-chamber is a passive pre-chamber.

A fourth example of the system, optionally including one or more of the previous examples, further includes where the plurality of slots is curved and configured to expel crescent-shaped flows from the pre-chamber to the primary combustion chamber.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system, comprising:
a pre-chamber arranged in a volume of a primary combustion chamber, wherein the pre-chamber comprises a plurality of slots and a plurality of flaps shaped identically to the plurality of slots.

2. The system of claim 1, wherein each of the plurality of slots and the plurality of flaps comprises a rectangular shape.

3. The system of claim 1, wherein each flap of the plurality of flaps extends from a long edge of a slot of the plurality of slots.

4. The system of claim 1, wherein the plurality of flaps and the plurality of slots are arranged symmetrically about a protection tube of the primary combustion chamber.

5. The system of claim 4, wherein the plurality of slots extends through an entire thickness of the protection tube.

6. The system of claim 5, wherein the plurality of slots is linear or curved.

7. The system of claim 1, wherein the pre-chamber further comprises a hole arranged at a bottom surface of the pre-chamber, equidistant to each slot of the plurality of slots, and wherein there are no other inlets or outlets in the pre-chamber except for the plurality of slots and the hole.

8. The system of claim 1, wherein the plurality of slots fluidly couples an interior volume of the pre-chamber to the primary combustion chamber.

9. The system of claim 1, wherein the pre-chamber comprises an ignition device and is free of a fuel injector.

10. An engine, comprising:
a primary combustion chamber comprising a piston and a pre-chamber, wherein the piston is configured to adjust a volume of only the primary combustion chamber, wherein the pre-chamber comprises a plurality of slots and a bottom hole fluidly coupling an interior volume of the pre-chamber to the volume of the primary combustion chamber, and wherein each of the plurality of slots comprises a flap, wherein the flap is configured to direct gases into the plurality of slots.

11. The engine of claim 10, wherein a first intake port is configured to provide a swirling flow and a second intake port is configured to provide a tumble flow, wherein the swirling flow is configured to travel along a circumference of the primary combustion chamber and into the pre-chamber via the plurality of slots.

12. The engine of claim 11, wherein the tumble flow is configured to travel along a head center line axis before contact the swirling flow and turning to flow along the head center line axis in an opposite direction relative to an original direction of travel.

13. The engine of claim 11, wherein the pre-chamber is configured to expel residual gases from the interior volume as the swirling flow enters the interior volume via the plurality of slots.

14. The engine of claim 10, wherein the pre-chamber is a first pre-chamber, further comprising a second pre-chamber identical to the first pre-chamber.

15. The engine of claim 14, wherein the first pre-chamber is oriented in a first orientation and the second pre-chamber is oriented in a second orientation, wherein the second orientation is identical to or different than the first orientation.

16. A system, comprising:
a primary combustion chamber comprising a piston configured to oscillate therein;
a plurality of intake ports configured to flow intake air into the primary combustion chamber, wherein the plurality of intake ports comprises a first intake port configured to expel intake air parallel to a transverse axis and a second intake port configured to expel intake air parallel to a head center line axis; and
a pre-chamber arranged within a volume of the primary combustion chamber, the pre-chamber comprising a cylindrical shape, wherein a bottom hole is arranged on a bottom circular surface and a plurality of slots is arranged on a circumferential wall, and wherein each of the plurality of slots comprises a flap, wherein the flap is configured to direct gases into the plurality of slots.

17. The system of claim 16, wherein the pre-chamber is free of an injector, further comprising where an ignition device is positioned to provide a spark within an interior volume of the pre-chamber, wherein the ignition device is aligned with the bottom hole along a central axis.

18. The system of claim 16, wherein the pre-chamber is a passive pre-chamber.

19. The system of claim 16, wherein the plurality of slots is curved and configured to expel crescent-shaped flows from the pre-chamber to the primary combustion chamber.

* * * * *